United States Patent [19]

Dalton et al.

[11] Patent Number: 5,197,614
[45] Date of Patent: Mar. 30, 1993

[54] FREESTANDING ORGANIZER

[75] Inventors: Suzanne Dalton; Clyde Foles, both of Ellsworth, Mich.

[73] Assignee: Wolff Wire Corporation, Ludington, Mich.

[21] Appl. No.: 797,295

[22] Filed: Nov. 25, 1991

[51] Int. Cl.$^5$ .............................................. A47F 5/00
[52] U.S. Cl. ...................................... 211/181; 211/11; 211/50
[58] Field of Search .................. 211/181, 106, 94, 10, 211/11, 162, 50

[56] References Cited

U.S. PATENT DOCUMENTS

| | | | |
|---|---|---|---|
| 4,034,864 | 7/1977 | Tyson et al. | 211/50 |
| 4,415,091 | 11/1983 | Wolff | 211/50 |
| 4,542,832 | 9/1985 | Minick et al. | 211/106 |
| 4,586,618 | 5/1986 | Norman | 211/181 X |
| 4,828,120 | 5/1989 | Beil et al. | 211/88 |
| 4,966,278 | 10/1990 | Rosi et al. | 211/11 X |
| 5,031,783 | 7/1991 | Goudreau | 211/181 |

Primary Examiner—Robert W. Gibson, Jr.
Attorney, Agent, or Firm—Price, Heneveld, Cooper, DeWitt & Litton

[57] ABSTRACT

An organizer rack for use on a desk surface, having a pair of parallel spaced legs, a rigid beam secured to both of the legs and holding them in spaced parallel vertical position extending generally normal to the beam, the beam having a plurality of upwardly opening pockets for securing and supporting accessory elements and having an anchor bracket at each end. Each of the legs has a vertical member with an offset portion extending lengthwise of the beam and telescoped into the end portion of the beam enclosed by an anchor bracket. The front and rear vertical portions of each anchor bracket are compressed toward each other to clamp the offset portion of the vertical member therebetween.

8 Claims, 2 Drawing Sheets

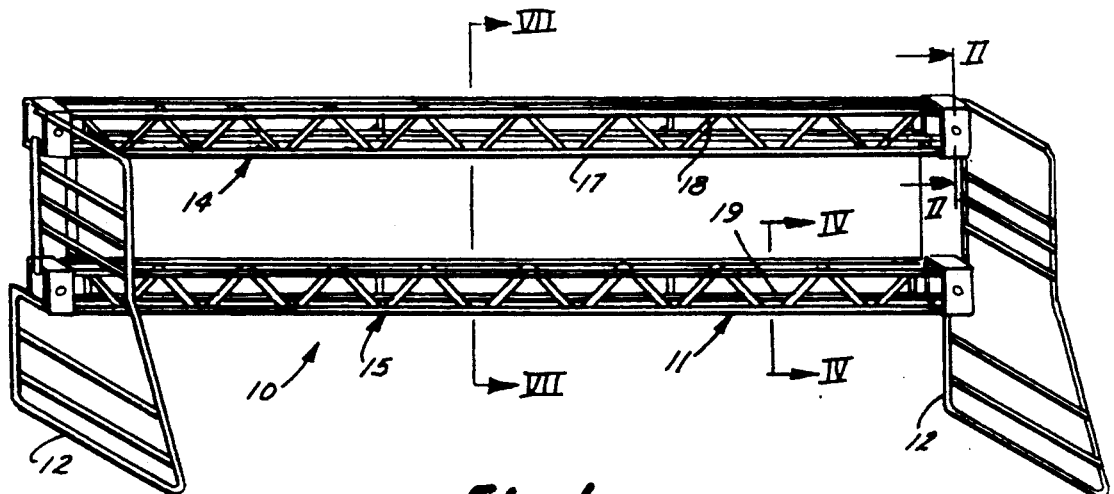
Fig. 1.
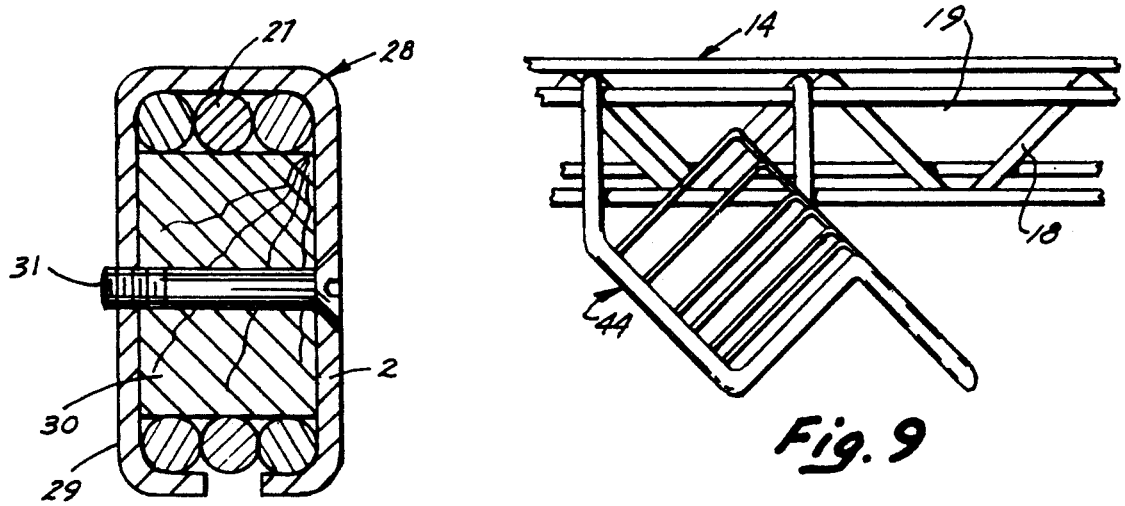
Fig. 2.
Fig. 9
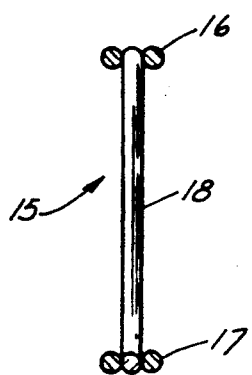
Fig. 4.
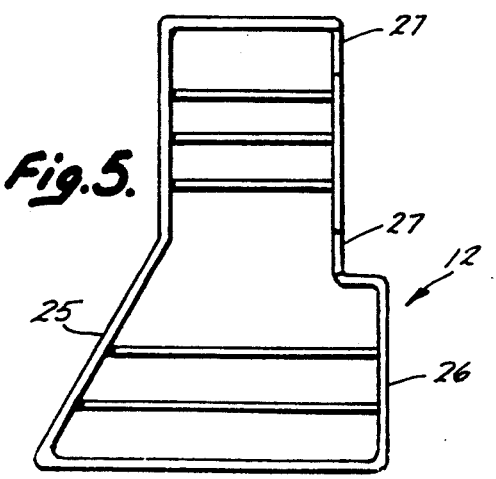
Fig. 5.
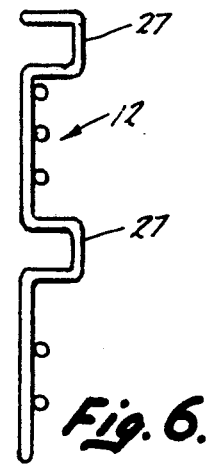
Fig. 6.

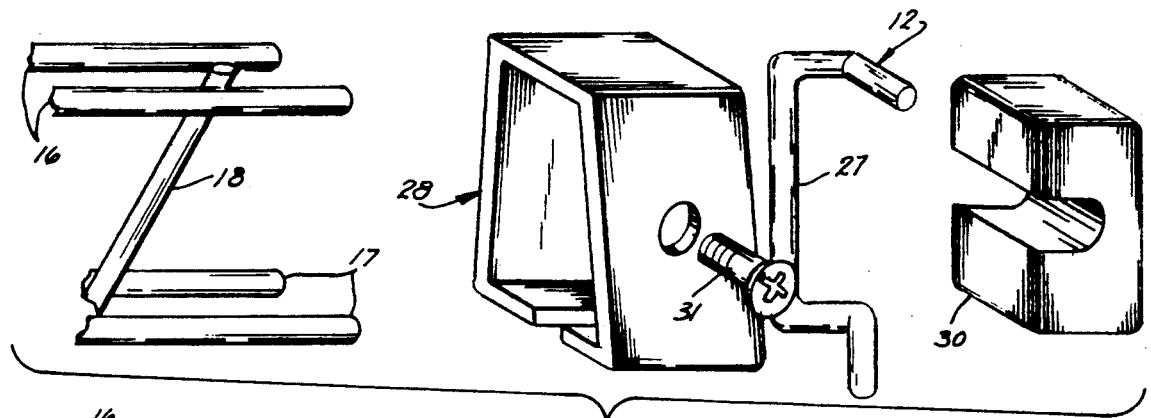
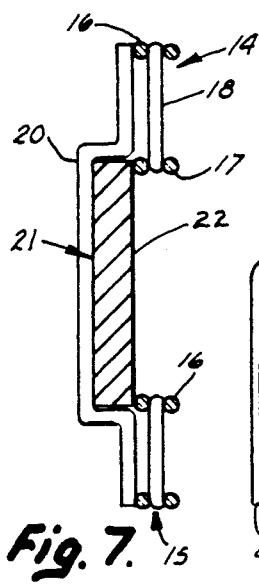
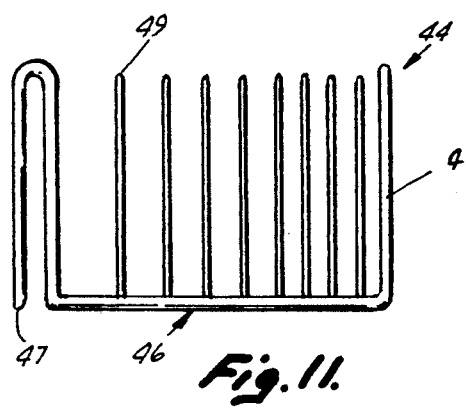
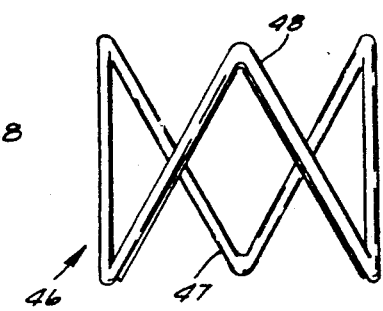
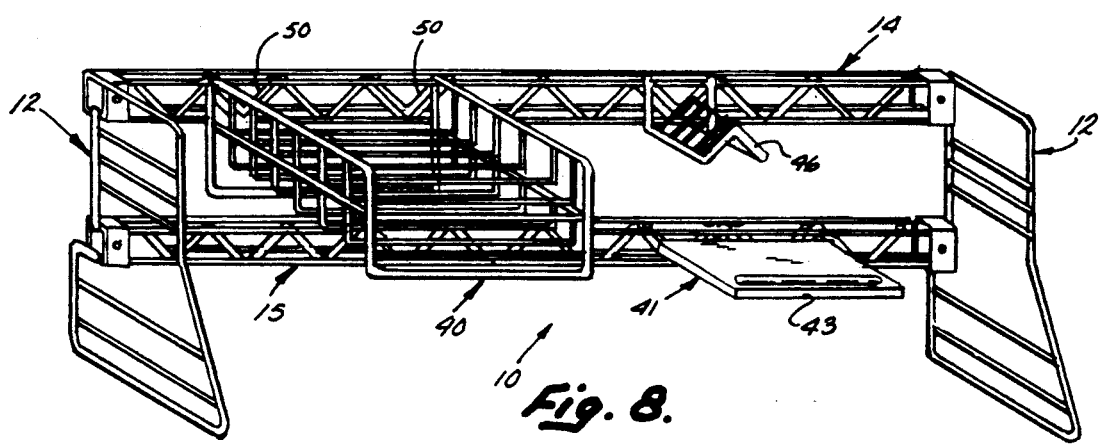

FREESTANDING ORGANIZER

BRIEF DESCRIPTION OF THE INVENTION

The invention provides a frame designed to be placed on a desk or table surface but not attached to it. The frame has upper and lower parallel members on which a number of article holding units of various designs and purposes can be detachably supported without the use of fasteners permitting their relocation, replacement and reorganization as desired.

BACKGROUND OF THE INVENTION

For many years, desk-type work areas were exclusively the top surfaces of desks of various sizes. Only static and, therefore, incapable of modification, facilities, were provided to hold and organize the various items that are essential to effective use of desk-type work surfaces. In the past three decades, this feature of work surface construction has been subjected to substantial changes in an effort to make it more convenient and effective for office use under the changing patterns of modern business activities. In this connection, various types of article holders have been developed to provide accessible storage and organization for articles of many types. An example of this type of development is disclosed in U.S. Pat. No. 4,508,300 entitled "Support Bracket For Accessory Beam" issued Apr. 2, 1985. Further examples of this type of development are disclosed in U.S. Pat. No. 4,415,091, entitled "Accessories For Movable Partition Systems" issued Nov. 15, 1983, and U.S. Pat. No. 4,542,832, entitled "Storage Accessories For Movable Partition Systems" issued Sep. 24, 1985.

These systems deal with the problem of storage and accessibility of various types of items in systems in which the work surface is one cantilevered from a partition type wall. These systems do not address the problem of organization and temporary storage of articles of various types in a work area not having walls or partitions from which to suspend the article organizing equipment. This type of situation is the one existing in a very large number of offices. Further, the increasing complexity of business activities necessitates rapid access to information and efficiency of its usage.

SUMMARY OF THE INVENTION

The invention provides a freestanding frame designed to be supported on the top of a table or desk where its facilities are immediately accessible to the user. It can also be placed on a surface such as that of a long, low storage unit. It can be used not only for storage but also to provide a surface and support for various units of equipment which have a tendency to utilize excessive amounts of desk surface. This equipment, for example, could include a telephone, facsimile machine, calculator equipment, or a small video monitor screen. The invention could also be used to hold, for quick and easy access, various types of manuals, instruction books and records. It has the advantage of being quickly and easily changed from one usage to another to accommodate changes in the user's responsibilities and duties. It also is not static and can be freely moved from one room or building to another as needed without requiring modification of the new room or work area to accommodate it. Thus, it has a high degree of flexibility of use and adaptability to operational circumstances.

BRIEF DESCRIPTION OF THE DRAWINGS

FIG. 1 is an oblique view of the organizer support frame;

FIG. 2 is an enlarged, sectional elevation view of the leg to beam anchor bracket;

FIG. 3 is an enlarged, exploded, oblique view of a leg to beam anchor;

FIG. 4 is a sectional view taken along the plane IV—IV of FIG. 1;

FIG. 5 is an end view of a leg;

FIG. 6 is a rear view of a leg;

FIG. 7 is a sectional elevation view taken along the plane VII—VII of FIG. 1;

FIG. 8 is an oblique, front view of the organizer with accessories;

FIG. 9 is a fragmentary oblique view of an item holder;

FIG. 10 is a front end view of an item holder; and

FIG. 11 is a side view of an item holder.

DESCRIPTION OF THE PREFERRED EMBODIMENT

Referring to FIG. 1, the numeral 10 identifies a storage and organizer frame having a central beam 11 supported by a pair of legs 12, one at each end. The central beam 11 is rigid, having an upper member 14 and an identical lower member 15. Each of these members has a pair of spaced rods 16 defining the top of the member and another pair 17 defining the bottom of the member. The upper rods 16 are vertically spaced from the lower rods 17 by the V-shaped intermediate elements 18 which preferably are of the same stock as the rods 16 and 17. The intermediate elements are welded to the upper and lower rods to provide a high strength rigid structure. The intermediate elements 18 form V-shaped pockets 19 for receiving the supporting hooks of accessories to be mounted on the beam (FIGS. 1, 8 and 9). This structure is described in U.S. Pat. No. 4,415,091 entitled "Accessories For Movable Partition Systems" issued Nov. 15, 1983.

The lower member 15 is identical to the upper member, just described, and is spaced some six to seven inches below the upper member. The exact spacing can be varied, depending upon the circumstances under which the invention will be used. The upper and lower members are rigidly connected by the web elements 20 which are welded to the rear face of each of the members 14 and 15 and both hold the members at a fixed spacing and serve the same function as the web of an I-beam. As will be observed from FIG. 7, each of the web elements is rearwardly offset to form a pocket 21 to seat the board serving as the back panel 22. It will be observed from FIG. 7 that both the pocket 21 and the back panel 22 overlap the rear face of both beams 14 and 15. This overlap holds the back panel 22 in the pocket 21. The back panel 22, if it is a close fit within the pocket 21, serves as a stiffener web resisting lengthwise deflection of the panel 10.

The beams 14 and 15 and the back panel 22 are supported at each end by one of the legs 12. Each of the legs has a forwardly extending foot portion 25 support the frame and stabilize it against loads which bias it to tip the frame forwardly (FIG. 5). The lower rear portion 26 of the leg 12 is offset rearwardly beyond the plane of the back panel 22 to resist rearward tipping of the frame. This is important because the frame is designed to rest on a supporting surface such as the top of a desk or a table without attachment to its support.

Above the rearwardly offset portion 26 of the leg, the leg has a pair of vertically spaced offsets or wings 27 extending in the plane of the back panel (FIG. 6). These offsets are identical and each extends into the end of one of the members 14 and 15. Each end of each beam is enclosed in an inverted U-shaped jacket 28, the lower end of the leg or sides 29 of which extend toward each other but are spaced so that the sides of the jacket can be squeezed toward each other (FIGS. 2 and 3). Each of the wings 27 of a leg 12 is inserted in one of the jackets 28 and has a filler block 30 seated within the offset of the leg (FIGS. 2 and 3). A bolt 31 threaded into one leg of the jacket, when tightened, forces the sides of the jacket to tightly clamp the block and thus prevent it from being dislodged from the jacket. The block, in turn, prevents withdrawal of the wing 27 from the jacket, thus effectively locking the leg to both the upper and lower members 14 and 15 of the beam 11. Because the structure provides such vertically spaced anchorages at each end of the beam, a stable and effective structure is created which effectively resists wracking both lengthwise and fore and aft of the beam.

FIG. 8 illustrates the rack equipped with a variety of article holders including a dual shelf document holder 40, illustrated on the right, which could be used as a communications in and out tray or as a work holding facility. This is supported from the upper member or beam and the shelves or trays are held horizontal by a pair of hooks 50 each seated in one of the pockets 19 of the upper beam or member 14. Mounted on the lower beam or member 15 is a platform 41 for a phone or other equipment such for example as dictation equipment. A larger version of the platform 41 could be used for a facsimile machine. The platform 41 has a wooden or plastic panel 43 detachably seated on a wire or rod frame which engages the pockets in and is anchored to the lower beam 15 in a manner similar to that of the document holder 40.

Above the platform 41 a memo holder 44 is secured to the upper member 11 of the beam and provides a simple, easy and compact means of holding small items such as telephone call reminders, memo pads and similar memoranda.

This memo or item holder is illustrated in detail in FIGS. 9–11. It has a one-piece external frame 46 having, at one end, a dependent, V-shaped support tongue 47 designed to seat in any one of the pockets 19 in either the upper or lower member 14 or 15 of the central beam 11. The opposite end 48 of the memo holder is of the same size as the support tongue 47 but is inverted so that its apex extends upwardly. Between the two ends, the holder has a plurality of smaller diameter separator wires 49 welded to the external frame 46 and functioning as spacers. The spacer wires 49 are of inverted V-shape with their apices in substantially the same plane as the apex of the opposite end 48. The separator wires 49 are arranged at a variety of spacings from each other to provide pockets adapted to seat articles with different thicknesses from postcards to items such as multi-page letters and memo pads.

It will be noted that the rack leaves most, if not all, of the surface of the desk or table top beneath it free of obstruction and therefore available for other uses. At the same time, it provides a wide range of facilities, all within easy reach of the user. It also has the advantage of not being functionally static because all of the individual units which adapt it to the user's needs can be changed simply by being lifted off and replaced by another having different capabilities and facilities. Further, it is not location static because, not only can it be easily and quickly relocated, it requires no modification of the supporting furniture such as a desk, table or shelf.

That for which an exclusive right is claimed is set forth in the hereinafter appended claims.

We claim:

1. An organizer rack for use on a desk surface, said rack having a pair of parallel spaced legs; a rigid beam secured to both of said legs and holding them in spaced parallel vertical position extending generally normal to said beam; said beam having a plurality of upwardly opening pockets for securing and supporting accessory elements; said beam having an anchor bracket at each end, each of said anchor brackets having front and rear vertical portions which portions are seated around an end portion of the beam; each of said legs having a vertical member, said vertical member having an offset portion extending lengthwise of the beam and telescoped into the end portion of the beam enclosed by an anchor bracket, means for compressing the front and rear vertical portions of each anchor bracket toward each other to clamp said offset portion of said vertical member therebetween.

2. The organizer rack described in claim 1 wherein each of said legs has a lower portion extending forwardly to support said rack against loads positioned forwardly of the rack and supported thereby, the lower portion of each of said legs also being offset rearwardly of the vertical plane including said beam to support said rack against rearward pivoting.

3. An organizer rack for use on a desk surface, said rack having a back member and a pair of legs of a length suitable for supporting said rack on a desk surface with said back member above and spaced from said surface, said legs being secured to said back member, one at each end thereof and extending forwardly therefrom, said back member having a vertically elongated longitudinally extending slot in each end, said legs each having attachment means thereon extending normal to the plane of the leg seated in said slot, a generally U-shaped anchor bracket having legs seated around the portion of said back member into which said attachment means is seated, fastener means for squeezing the legs of said bracket together to clamp said attachment means to said back member.

4. An organizer rack as described in claim 3 wherein a pair of said back members are provided each attached to said legs in vertically spaced relationship to each other, a panel extending vertically between said beams and means supporting said panel on said beams.

5. An organizer rack as described in claim 4 wherein said panel extends vertically the entire distance between said beams.

6. An organizer rack as described in claim 5 wherein a plurality of vertical members extend between said beams and support said panel, said vertical members being secured to both of said beams, the portion of said vertical member between said beams being offset rearwardly to provide a pocket for seating said panel.

7. In combination an elongated organizer rack for use on a desk surface and at least one article holder, said article holder having a single means for detachably engaging said rack and supporting said article holder cantilevered out over the desk surface, said article holder having a one-piece rectangular peripheral frame entirely surrounding said article holder, said frame having an inverted V-shaped first end member at one end and a V-shaped second end member at the other end, said end members being connected by straight parallel side portions between said first and second end members, a plurality of upstanding inverted V-shaped article supports secured to and extending between said side portions of said frame, said article supports being parallel and spaced apart at different spacings to provide support for articles of different thicknesses placed between them.

8. The combination recited in claim 7 wherein said first and second end members and article supports are all of the same height.

* * * * *

UNITED STATES PATENT AND TRADEMARK OFFICE
CERTIFICATE OF CORRECTION

PATENT NO. : 5,197,614
DATED : March 30, 1993
INVENTOR(S) : Suzanne Dalton et al It is certified that error appears in the above-indentified patent and that said Letters Patent is hereby corrected as shown below:

Col. 2, line 63

After "portion 25" insert --to--.

Signed and Sealed this

Twenty-ninth Day of March, 1994

Attest:

BRUCE LEHMAN

*Attesting Officer*      *Commissioner of Patents and Trademarks*